Oct. 2, 1928.

W. J. KENNEY

WATER SOFTENER

Filed March 11, 1926

1,685,817

Inventor:
William J. Kenney,
by Wm. F. Freudenreich,
Atty.

Patented Oct. 2, 1928.

1,685,817

UNITED STATES PATENT OFFICE.

WILLIAM J. KENNEY, OF CHICAGO, ILLINOIS, ASSIGNOR TO ZEOLITE ENGINEERING CO., A CORPORATION OF ILLINOIS.

WATER SOFTENER.

Application filed March 11, 1926. Serial No. 93,899.

The object of the present invention is to produce a water softener apparatus, of the type in which the raw water is caused to flow through a body of zeolitic material, which shall consist of a few simple parts, so that it may be manufactured at a low cost, and which shall be efficient in operation, and in which regeneration is easily effected.

Figure 1:
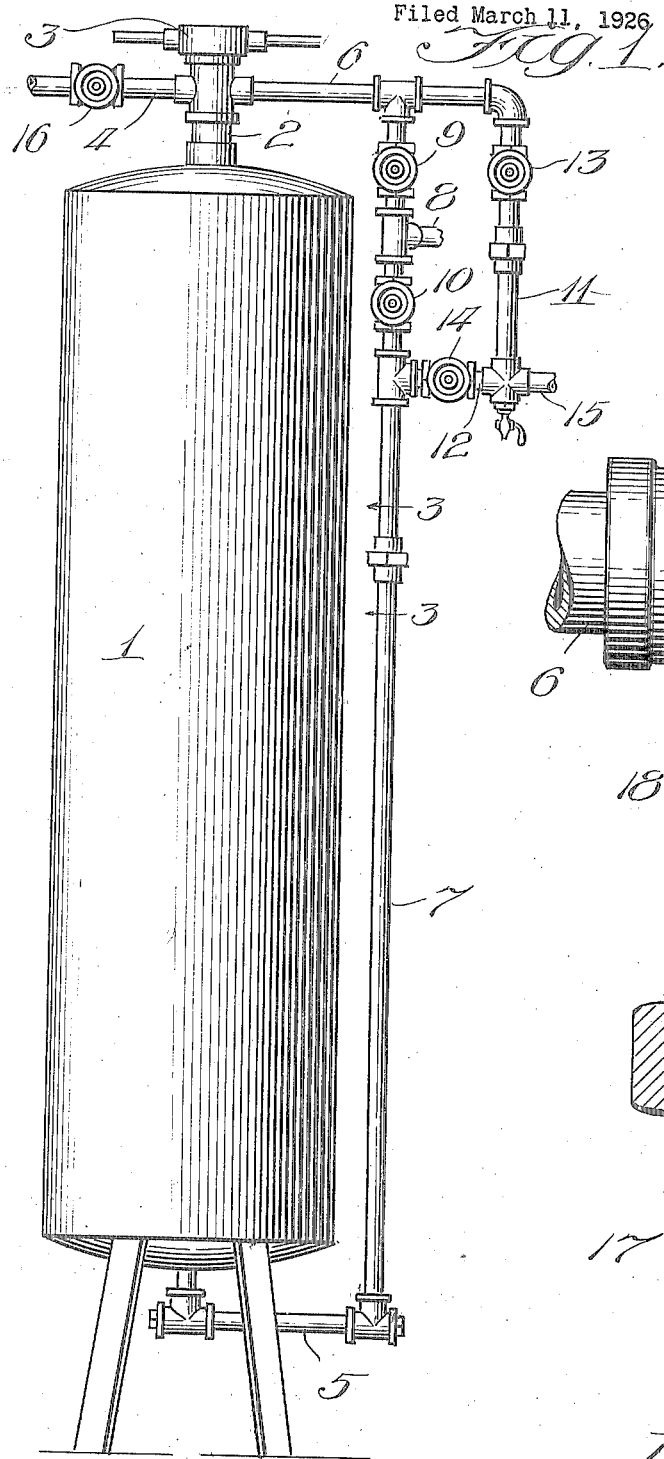
Figure 2:
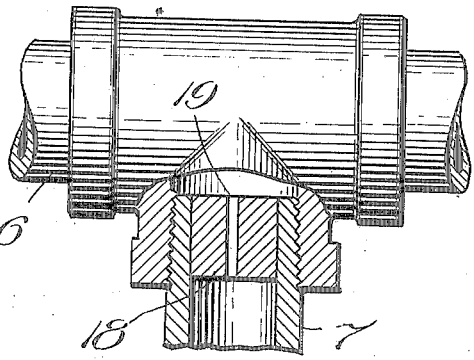
Figure 3:
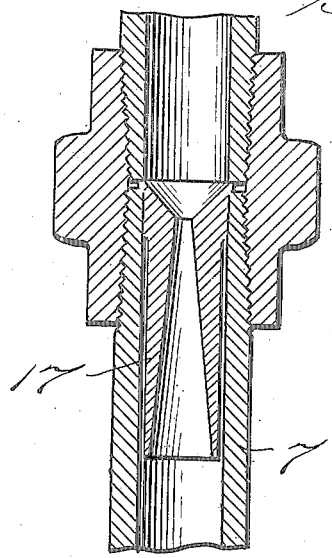

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a side elevation of a softener arranged in accordance with the present invention; Fig. 2 is a detail, partly in elevation and partly in section, on a larger scale through the part for controlling the rate of flow of water during regeneration; and Fig. 3 is a sectional view, on the same scale as Fig. 2, taken approximately on line 3—3 of Fig. 1.

Referring to the drawing, 1 represents a tank containing the usual bed of zeolite, not shown. At the top of the tank is a neck 2 closed at its upper end by a detachable cap 3. The service line 4 is connected to this neck. The water to be softened enters the bottom of the tank through a pipe 5 and flows up through the tank and out of the service pipe, as required. A second pipe, 6, is connected to the neck 2, and this pipe is connected to the pipe 5 by a long vertical conduit 7 lying beside the tank. The raw water is delivered through a supply pipe 8 that is connected to the conduit 7 a short distance below the upper end of the latter. In the conduit 7, on opposite sides of the connection between the same and the pipe 8 are manual valves 9 and 10. The conduit 7 is provided with a by-pass extending around the valves 9 and 10. In the arrangement shown, this by-pass consists of an extension of the pipe 6, a short vertical conduit 11, and a connection 12 between the lower end of the conduit 11 and the conduit 7. In this by-pass are two manual valves 13 and 14. The conduit 11 is provided with a discharge outlet at a point between the valves 13 and 14, this outlet being shown as consisting of a pipe 15.

During the normal use of the apparatus, all of the valves heretofore described, except the valve 10 are closed, and water flows from the supply pipe 8, through the conduit 7 and pipe 5, up through the tank and out of the service pipe as required. When it is desired to regenerate, all of the valves except the valve 13 are closed, and the pet cock 15 is opened so as to permit some of the water to drain out of the top of the system. The service pipe may be provided with a valve 16, either a manual valve, or a check valve, to prevent back flow and the draining of the service system. After some of the water has been drained off, the cap 3 is removed, and a quantity of salt is introduced into the tank through the neck. The cap is again screwed on and all of the valves except the valve 9 and the valve 14 are closed. Water now flows from the supply pipe 8, through the valve 9 and pipe 6 into the top of the tank, passing down through the bed of zeolite and being discharged from the bottom of the tank into the pipe 5 and conduit 7. From the conduit 7, the water flows through the valve 14 and out of the outlet 15. After the regeneration has been completed, it is necessary to wash out the raw water that remains in the top of the tank. To do this, the valves 10 and 13 are opened and the valves 9 and 14 are closed. Water will now flow through the tank, just as for normal service, but will be discharged into the pipe 7 and the by-pass conduit 11 and out through the pet cock. After the raw water that remained in the tank has been displaced, all of the valves except the valve 10 are again closed and the raw water will pass into the tank and be softened to meet the demand.

It is necessary accurately to regulate the flow of water during the softening process, since a zeolite bed of a given size and form will have a definite softening capacity which should be utilized advantageously in order to secure the maximum results in an apparatus of a given size; a more rapid flow preventing the complete softening of the water. It is also important that the control of the flow be effected without decrease in pressure. To this end I have placed in the conduit 7 a Venturi tube 17, shown in Fig. 3; this Venturi tube being accurately machined so as to insure the proper flow at the available pressure, without reduction in the pressure.

The flow of water must also be controlled during regeneration and I have therefore placed in the conduit 7, between the valve 9 and the pipe 6, a plug 18 provided with a small orifice 19, as shown in Fig. 2, thus compelling the water to flow slowly during the regenerating operation.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

In an apparatus of the character described, a reservoir having an outlet and an inlet, a conduit connecting the outlet and the inlet, a service pipe connected to the outlet, a supply pipe connected to said conduit, manual valves in said conduit on opposite sides of the connection with the supply pipe, said conduit having a section at a point between the outlet and the nearest valve in the form of a passage of very small cross-sectional area, and there being in the conduit between said inlet and the nearest valve a section having the shape of a Venturi tube.

In testimony whereof, I sign this specification.

WILLIAM J. KENNEY.